(12) United States Patent
Yeung et al.

(10) Patent No.: US 11,822,503 B2
(45) Date of Patent: Nov. 21, 2023

(54) DATA TRANSMISSION APPARATUS AND METHOD USING SIGNAL TRANSITION

(71) Applicant: SUZHOUKUHAN INFORMATION TECHNOLOGIES CO., LTD., Jiangsu (CN)

(72) Inventors: Kwok Wah Yeung, Jiangsu (CN); Di Xu, Jiangsu (CN)

(73) Assignee: SUZHOUKUHAN INFORMATION TECHNOLOGIES CO., LTD., Jiangsu (CN)

( * ) Notice: Subject to any disclaimer, the term of this patent is extended or adjusted under 35 U.S.C. 154(b) by 0 days.

(21) Appl. No.: 17/996,171

(22) PCT Filed: Mar. 11, 2021

(86) PCT No.: PCT/CN2021/080229
§ 371 (c)(1),
(2) Date: Oct. 13, 2022

(87) PCT Pub. No.: WO2021/208647
PCT Pub. Date: Oct. 21, 2021

(65) Prior Publication Data
US 2023/0126852 A1    Apr. 27, 2023

(30) Foreign Application Priority Data
Apr. 17, 2020  (CN) .......................... 202010307000.1

(51) Int. Cl.
 G06F 13/42 (2006.01)
 G06F 1/12 (2006.01)
 G06F 13/362 (2006.01)
(52) U.S. Cl.
 CPC ................ *G06F 13/42* (2013.01); *G06F 1/12* (2013.01); *G06F 13/3625* (2013.01)

(58) Field of Classification Search
 CPC .... G06F 13/42; G06F 13/404; G06F 13/4213; G06F 13/4217; G06F 13/4221;
(Continued)

(56) References Cited

U.S. PATENT DOCUMENTS 8,938,014 B1 * 1/2015 Wang .................. H04L 25/4902
375/259
8,964,879 B2 * 2/2015 Navid .................. H04L 1/0002
375/259

(Continued)

FOREIGN PATENT DOCUMENTS

| CN | 1971482 A | 5/2007 |
| CN | 106849954 A | 6/2017 |
| CN | 110737620 A | 1/2020 |

OTHER PUBLICATIONS

International Search Report (with English translation) and Written Opinion issued in PCT/CN2021/080229, dated May 26, 2021, 8 pages provided.

(Continued)

*Primary Examiner* — Raymond N Phan
(74) *Attorney, Agent, or Firm* — HAMRE, SCHUMANN, MUELLER & LARSON, P.C.

(57) ABSTRACT

Disclosed are a data transmission apparatus and method, used for transmitting data between a transmitter and a receiver connected by N data lines, N being an integer greater than 1. The method comprises: sending a plurality of data units one by one; on each transmission signal, inverting the level of one and only one data line corresponding to the currently sent data unit; extracting the transmission signal, and decoding the data unit corresponding to the data line according to the data line of which level is inverted among the N data lines; and sampling the data unit and then outputting.

18 Claims, 4 Drawing Sheets

(58) Field of Classification Search
CPC ............. G06F 13/4247; G06F 13/4256; G06F 13/426; G06F 13/3625; G06F 13/362; G06F 13/36; G06F 13/364; G06F 13/38; G06F 1/04; G06F 1/14; G06F 1/12
See application file for complete search history.

(56) References Cited

U.S. PATENT DOCUMENTS

| | | | |
|---|---|---|---|
| 2009/0243681 A1* | 10/2009 | Zerbe | H04L 7/0066 327/163 |
| 2012/0229310 A1 | 9/2012 | Chang | |
| 2019/0068218 A1* | 2/2019 | Sadowski | H04B 1/16 |
| 2020/0186166 A1* | 6/2020 | Sadowski | H04B 3/54 |

OTHER PUBLICATIONS

Office Action issued in corresponding Chinese Application No. 2020103070001, dated Apr. 6, 2022, with English machine translation.

* cited by examiner

DATA TRANSMISSION APPARATUS AND METHOD USING SIGNAL TRANSITION

FIELD OF THE INVENTION

The present invention relates generally to the field of data transmission technology, in particular to a data transmission apparatus and method, a data transmission system, and a bidirectional data transmission system.

BACKGROUND OF THE INVENTION

Figure 1:
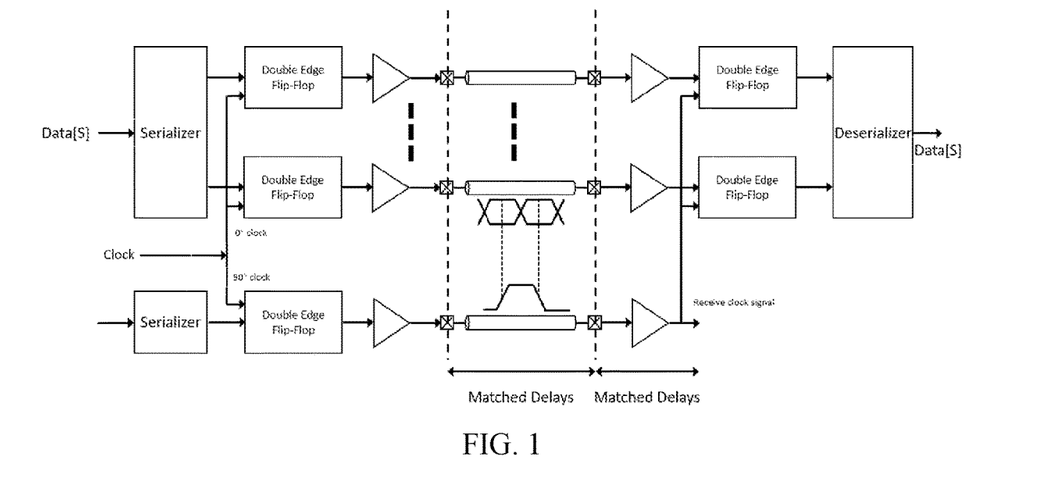
FIG. 1 illustrates a schematic view of a data transmission apparatus in the prior art.

Conventional high-speed parallel bus interfaces rely on differential signals on data and clock/selector pulses, such as high-speed DDR4 DRAM interfaces. Recently, single-ended data signals with single-ended clock forwarding, as shown in FIG. 1, have been proposed to enable high-speed operation at low power consumption.

Another class of bus interface designs uses a lower frequency clock to reduce power consumption, but at the cost of a complex clocking and data recovery scheme on the receiver side.

BRIEF SUMMARY OF THE INVENTION

The purpose of the present invention is to provide a data transmission apparatus and method to improve data transmission rate and reduce power consumption.

The present application discloses a data transmission apparatus comprising a transmitter and a receiver connected by N data lines, N being an integer greater than 1; wherein the transmitter comprises:
  N first transmitting units, each outputting a transmission signal to the N data lines; and
  an encoder, configured to control that on each transmission signal, according to the currently sent data unit, level output by one and only one first transmitting unit is inverted, such that level of one and only one data line among the N data lines is inverted;
the receiver comprises:
  N receiving units, each receiving a transmission signal from the N data lines; and
  a decoder, connected to the N receiving units and configured to decode the data unit corresponding to the data line according to the data line of which level is inverted among the N data lines.

In one embodiment, the encoder is further configured to encode data to avoid sending more than two identical data units in succession, causing the level of the same one among the N data lines to be inverted for more than twice in succession.

In one embodiment, the decoder further decodes the data encoded by the encoder.

In one embodiment, the encoder comprises a state machine and the decoder comprises a state machine.

In one embodiment, the data transmission apparatus further comprises a clock generator for generating a clock signal, wherein the clock signal samples data units sent by the encoder to generate the transmission signal;
the receiver further comprises a clock recovery logic which connects the N receiving units and is configured to perform a clock recovery operation on the transmission signal output by the N receiving units and to output a recovered clock signal, wherein the recovered clock signal samples the decoded data units and then outputs.

In one embodiment, the clock signal is a non-differential clock signal.

In one embodiment, the receiving unit comprises an edge detection module and an edge feedback module, the edge detection module is configured to detect level inversion of the N data lines, and the edge feedback module is configured to acquire a signal output by the edge detection module and output it to the edge detection module for a next detection.

In one embodiment, the encoder outputs a plurality of M-bit data units one by one, wherein M is an integer greater than 1.

The present application also discloses a data transmission system comprising a plurality of data transmission apparatuses described above, further comprising:
  an asynchronous clock recovery logic which performs an asynchronous logic operations on the clock signals output by the receivers of the plurality of data transmission apparatuses and outputs the recovered clock signals.

In one embodiment, the plurality of data transmission apparatuses share the same clock generator.

In one embodiment, the plurality of data transmission apparatuses are used to transfer data with different sizes.

The present application also discloses a data transmission method for transmitting data between a transmitter and a receiver connected by N data lines, N being an integer greater than 1, the method comprises:
  sending a plurality of data units one by one;
  on each transmission signal, inverting the level of one and only one data line corresponding to the currently sent data unit;
  extracting the transmission signal, and decoding the data unit corresponding to the data line according to the data line of which level is inverted among the N data lines; and
  sampling the data unit and then outputting.

In one embodiment, further comprising:
  sampling the currently sent data unit by a clock signal to generate the transmission signal;
  performing a clock recovery operation on the transmission signal and outputting a recovered clock signal; and
  according to the recovered clock signal, sampling the decoded data unit and then outputting.

In one embodiment, further comprising: encoding data to avoid sending more than two identical data units in succession, causing the level of the same data lines among the N data lines to be inverted for more than twice in succession.

The present application also discloses a bidirectional data transmission system comprising a master data transmission apparatus and a slave data transmission apparatus connected by N data lines, N being an integer greater than 1; wherein the master data transmission apparatus comprises a transmitter and a receiver described above, and the slave data transmission apparatus comprises a transmitter and a receiver described above.

In one embodiment, the bidirectional data transmission system further comprising: a clock generator connected to a transmitter of the master data transmission apparatus; and a clock recovery/generator connected to a transmitter of the slave data transmission apparatus.

In one embodiment, the bidirectional data transmission system further comprises a transmission controller for controlling the transmission process between the master data transmission apparatus and the slave data transmission apparatus to avoid transmission conflicts.

Compared to the prior art, the present application has at least the following beneficial effects:
  In the present application, on each transmission signal, inverting the level of one and only one among the N data lines corresponding to the currently sent data unit, which can reduce power consumption and increase data transmission speed.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute Various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

BRIEF DESCRIPTION OF THE DRAWINGS

Non-limiting and non-exhaustive embodiments of the present application are described with reference to the following accompanying drawings, wherein the same accompanying markings refer to the same portions in the respective drawings unless otherwise indicated.

DESCRIPTION OF PREFERRED EMBODIMENT

Aspects and embodiments of the present application will now be described. The following description provides specific details for a thorough understanding and implementation of the description of these embodiments. However, it will be understood by those skilled in the art that the present application can be practiced without many of these details.

In addition, some well-known structures or functions may not be shown or described in detail in order to be concise and to avoid unnecessarily obscuring the relevant description.

The terminology used in the description given below is intended to be interpreted in its broadest reasonable manner, even though it is used in conjunction with the detailed description of some specific examples of the present application. Certain terms may even be emphasized below, however, any term that is intended to be interpreted in any restricted manner will be clearly and specifically defined in this detailed description section.

Embodiment I

Figure 2:
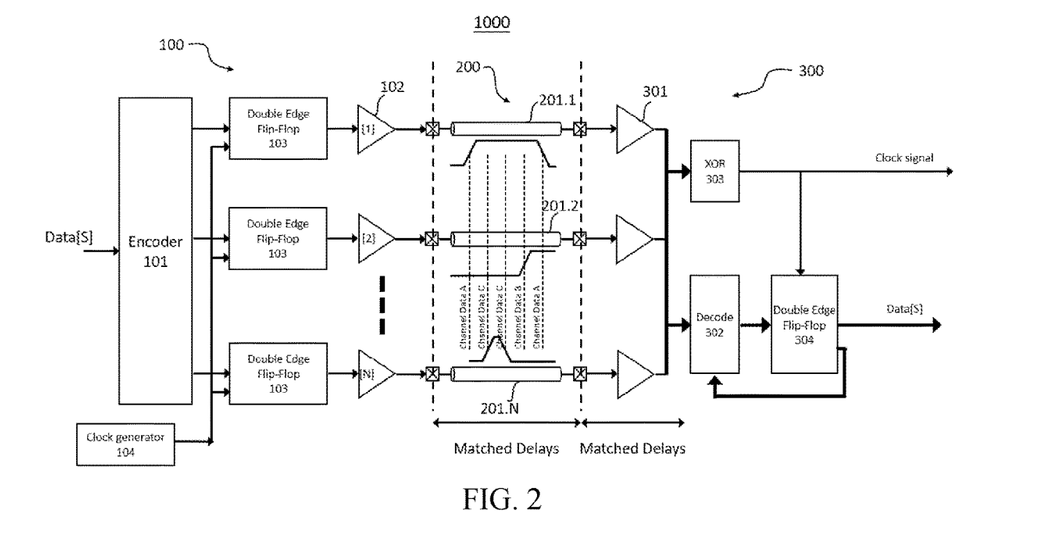
FIG. 2 illustrates a schematic diagram of a data transmission apparatus in an embodiment of the present application.

A data transmission apparatus 1000 is disclosed in Embodiment I of the present application, and FIG. 2 illustrates a schematic diagram of a data transmission apparatus 1000, the apparatus 1000 comprises a transmitter 100, a channel 200, and a receiver 300, the transmitter 100 and the receiver 300 are connected by N data lines 201.1, . . . , 201.N in the channel 200, wherein N is an integer greater than 1. For example, N is 4, 5, 8, etc.

Wherein, the transmitter 100 comprises:
N first transmitting units 102, each outputting a transmission signal to the N data lines 201;
an encoder 101, configured to control that on each transmission signal, according to the currently sent data unit, level output by one and only one first transmitting unit 102 is inverted, such that the level of one and only one data line among the N data lines 201 is inverted.

In an embodiment, the encoder outputs a plurality of M-bit data units one by one, wherein M is an integer greater than 1. The input to the encoder is a plurality of M-bit data units, the plurality of M-bit data units are output to $2^M$ data lines or to data lines greater than $2^M$. For example, the input to encoder 101 is a plurality of 2 bits, and encoder 101 outputs the input plurality of 2 bits one by one to 4 or greater than 4 (e.g., 5) data lines, and the input to encoder 101 is a plurality of 3 bits, and the encoder outputs to 8 or greater than 8 (e.g., 9, 10) data lines.

In an embodiment, the transmitter 100 further comprises N double-edge flip-flops 103, each double-edge flip-flop 103 is respectively connected to one transmitting unit 102, the double-edge flip-flops 103 samples at both rising and falling edges of the data, which can increase the data transmission speed.

In an embodiment, the data transmission apparatus 1000 further comprises a clock generator 104 for generating the clock signal. The clock generator 104 is connected to each double-edge flip-flop 103 and provides the clock signal to the double-edge flip-flops 103. In embodiments not including the double-edge flip-flops 103, the clock generator 104 is directly connected to each transmitting unit 102. Wherein the clock signal samples data units sent by the encoder 101 to generate the transmission signal. The transmission signal is sent by the transmitting unit 102 to a data line for transmission.

In an embodiment, the clock signal is a non-differential clock signal, that is, the clock signal is a single ended signal.

Wherein, the receiver 300 comprises:
N receiving units 301, each receiving the transmission signal from the N data lines 201;
a decoder 302, connected to the N receiving units 301 and configured to decode the data unit corresponding to the data line according to the data line the level of which is inverted among the N data lines 201.

In an embodiment, the receiver 300 further comprises a double-edge trigger 304, the double-edge trigger 304 samples at both rising and falling edges of the data, which can increase the data transmission speed.

In an embodiment, the data transmission state further comprises a clock recovery logic 303 which connects the N receiving units 301 and is used to perform clock recovery operation on the transmission signal output from the N receiving units 301 and output the recovered clock signal, the recovered clock signal samples the decoded data unit and then outputs.

In an embodiment, on the first clock signal, encoder 101 sends data unit A, for example, "00", which is sampled by the clock signal to generate an output signal and transmitted via the data line, and the level on the data line 201.1 corresponding to this data unit A is inverted from 0 to 1. On the second clock signal, encoder 101 sends data unit C, e.g. "01", and the level on the data line 201.N corresponding to this data unit C is inverted from 0 to 1. On the third clock signal, encoder 101 sends data unit C, e.g. "01", and the level on the data line 201.N corresponding to this data unit C is inverted from 1 to 0. On the fourth clock signal, encoder 101 sends data unit B, e.g., "10", and the level on data line 201.2 corresponding to this data unit B is inverted from 0 to 1. On the fifth clock signal, encoder 101 sends data unit A, e.g. "00", and the level on data line 201.1 corresponding to this data unit A is inverted from 1 to 0, and so on. Thus, on each transmission signal, there is one and only one level of the data line corresponding to the currently sent data unit is inverted.

Figure 3:
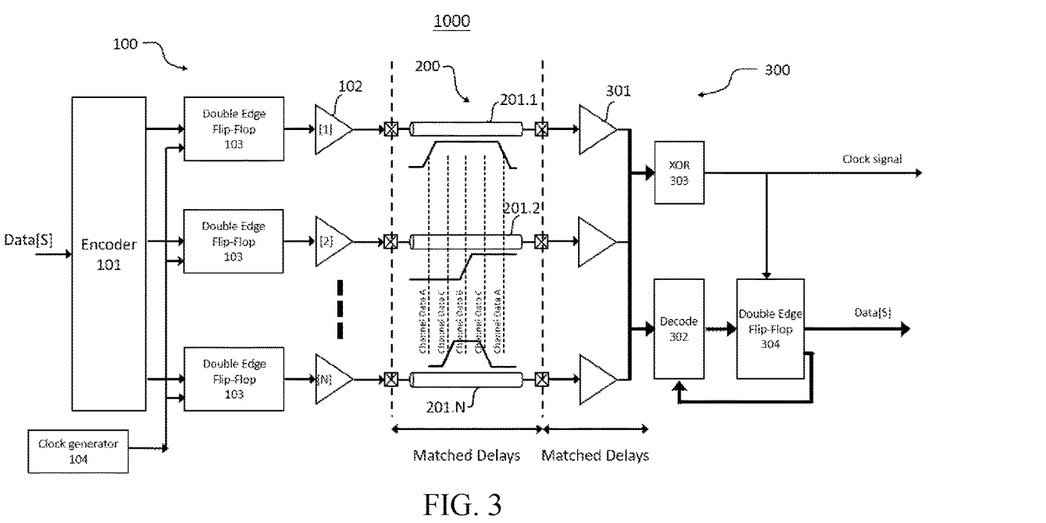
FIG. 3 illustrates a schematic diagram of a data transmission apparatus in another embodiment of the present application.

As can be seen in FIG. 2, when two data units C are sent in succession, the data line 201.N is inverted twice in succession, causing a back-to-back phenomenon. In another embodiment, in order to avoid the back-to-back phenomenon during transmission, the encoder 101 is also configured to encode the data to avoid the same one among the N data lines to be inverted for twice in succession on more than two consecutive clock signals. In this embodiment, the decoder 302 also decodes the data encoded by the encoder 101. Referring to FIG. 3, the encoder 101 makes it possible to send data B on the third clock signal, avoiding the continuous transmission of data C and thus avoiding the back-to-back phenomenon. It should be noted that the encoder outputs a plurality of M-bit data units to 2M data lines, however, to avoid the back-to-back phenomenon, it is necessary to output to data lines greater than $2^M$. For example, in the embodiment of FIG. 2, 4 data lines are required, while in the embodiment of FIG. 3, 5 data lines are required.

The encoder 101 encodes the data in various ways. In one embodiment, the encoder 101 and decoder 302 include a state machine (not shown in the figures), the state machine stores the data units transmitted on the last clock signal. For example, the input to the encoder 101 is 2 bits of data, which has four valid data: 00, 01, 10, and 11. The state machine of the encoder 302 has six states: Z, A, B, C, D, E. Wherein state Z is the encoder 101 initial state. The other 5 states are: state A represents the data line 201.1 inverted at the last time, state B represents the data line 201.2 inverted at the last time, state C represents the data line 201.3 inverted at the last time, state D represents the data line 201.4 inverted at the last time, and state E represents the data line 201.5 inverted at the last time. If the input to the encoder 101 is 00 and the state of the state machine is not A, then flip the data line 201.1 and the new state is A. If the input to the encoder 101 is 00 and the state of the state machine is A, then flip the data line 201.5 and the new state is E. When the input to the encoder 101 is 01, 10, 11 and states are B, C, D, a similar method is used to flip the data lines. Thus, if the encoder input is the same data unit in succession, such as 01, 01, 01, the data lines 201.2, 201.5, 201.2 are inverted sequentially, thus avoiding the back-to-back inversion on each data line. In this embodiment, the decoder 302 uses the state machine to store the last decoding result and can identify that the data transmitted at this time is consistent with the state machine whenever it sees the data line 201.5 is inverted.

Higher power efficiency can be achieved by transmitting the same data in the architecture in FIG. 3 compared to the conventional architecture in FIG. 1. This is because in the conventional architecture shown in FIG. 1, there are four data lines and one clock line in the five signal buses, wherein the four data lines need to be inverted on average two lines on each clock, and the clock line must be inverted, so three signal lines need to be inverted for every four bits transferred, which means that ¾ signal transition is required per bit transferred. In the architecture shown in FIG. 3, only one signal line needs to be inverted for every two bits transferred, which means that ½ signal conversion is required per bit transferred. Compared with the traditional architecture which requires ¾ signal transition, the low conversion rate of this application directly brings about power efficiency. In fact, the traditional architecture requires the clock signal to be differential when transmitting at high speed, which means that the traditional architecture requires 6 signal lines, requiring more signal transition, and the power efficiency of this application is more obvious compared to this scheme.

Figure 4:
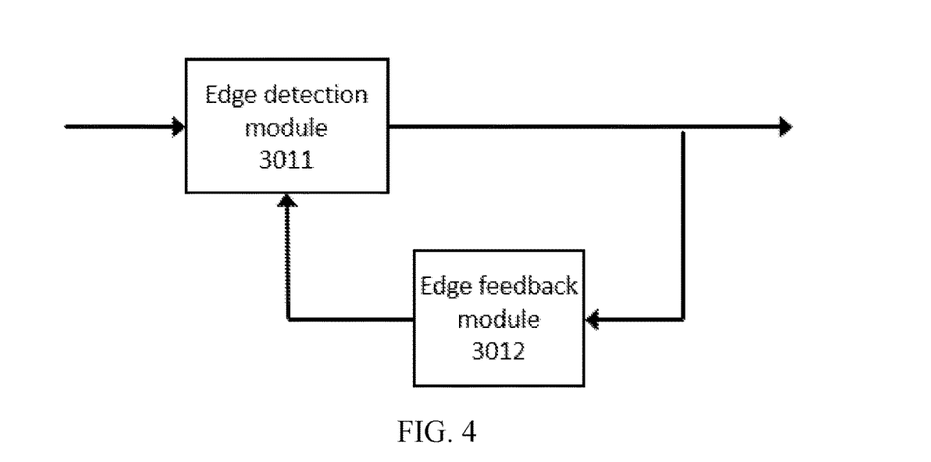
FIG. 4 illustrates a schematic diagram of a receiving unit in an embodiment of the present application.

In an embodiment, referring to FIG. 4, the receiving unit 301 includes an edge detection module 3011 and an edge feedback module 3012, the edge detection module 3011 is used to detect the level inversion of the N data lines 201, and the edge feedback module 3012 is used to obtain the signal output from the edge detection module 3011 and output to the edge detection module 3011 for the next detection. In this embodiment, on each clock signal, there is one and only one level of the data line corresponding to the currently sent data unit is inverted, so that when the same data unit is transmitted, the state of the corresponding data line can be predicted, for example, if the state on a data line is 1, when the same data unit is transmitted on the next time, the state of that data line should be 0, and if the state on that data line is 0, when the same data unit is transmitted on the next time, the state of that data line should be 1. That is, the change of the data line is determined, and the use of the edge feedback module can improve the speed of data detection and thus the speed of data transmission.

Embodiment 2

Figure 5:
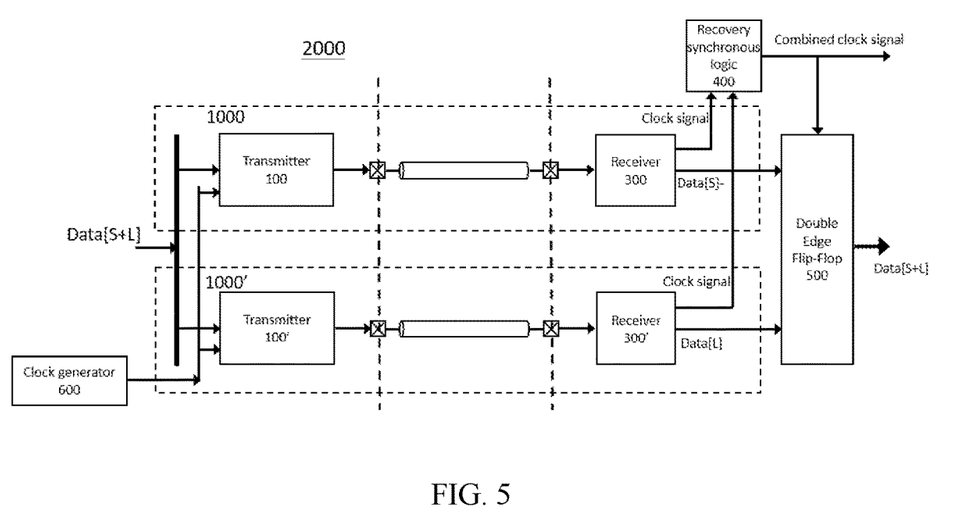
FIG. 5 illustrates a schematic diagram of a data transmission system in an embodiment of the present application.

A data transmission system is disclosed in Embodiment 2 of this application, comprising a plurality of data transmission apparatuses described above, and further comprises: an asynchronous clock recovery logic which performs an asynchronous logic operation on the clock signals output by the receivers of the plurality of data transmission apparatuses, and outputs the recovered clock signals. FIG. 5 illustrates a schematic diagram of a data transmission system 2000 comprising two of the data transmission apparatuses 1000, 1000' described in Embodiment 1. The system shown in FIG. 5 is illustrated with only two data transmission apparatuses as examples, and it should be understood by those skilled in the art that the present application is not limited in this way.

The clock recovery logics 303 of the first data transmission apparatus 1000 and the second data transmission apparatus 1000' are respectively connected to the asynchronous clock recovery logic 400, the asynchronous clock recovery logic 400 recovers the clock signals extracted by the clock recovery logics 303 and outputs.

The decoders 302 of the first data transmission apparatus 1000 and the second data transmission apparatus 1000' are respectively connected to a third double-edge flip-flop 500, according to the clock signals output by the clock asynchronous clock recovery logic 400, the third double-edge flip-flop 500 samples and outputs the signals output by the decoders 302 of the first data transmission apparatus 1000 and the second data transmission apparatus 1000'.

In an embodiment, the encoders 101 of the first data transmission apparatus 1000 and the second data transmission apparatus 1000' are further configured to encode the data to avoid two consecutive level inversion of the same one among the N data lines on more than two consecutive clock signals. In this embodiment, the decoders of the first data transmission apparatus 1000 and the second data transmission apparatus 1000' also decode the data encoded by the encoders 101.

In one embodiment, the first data transmission apparatus 1000 and the second data transmission apparatus 1000' share the same clock generator 600. In other embodiments, the first data transmission apparatus 1000 and the second data transmission apparatus 1000' may also use their respective clock generators.

In one embodiment, the first data transmission apparatus 1000 and second data transmission apparatus 1000' are respectively used to transfer data with different sizes. In this embodiment, the first data transmission apparatus 1000 may transmit S bits of data and the second data transmission apparatus 1000' may transmit L bits of data. In this embodiment, to transfer data with the same size, the data transmission system takes less time than using only one data transmission apparatus to transfer the data twice.

The operation speed of the high-speed signal bus interface depends on matching the delays among all bus signals, so the high-speed bus design imposes limits on how many parallel signals can be applied to the bus. Narrow buses can be combined in this embodiment to form a wide bus, and the receiver clocks of the narrow buses can be "wired" together, for example using Muller C-elements, to generate the final receiver clocks of the wide bus, extending the bus width while maintaining high-speed bus operation.

Embodiment 3

Figure 6:
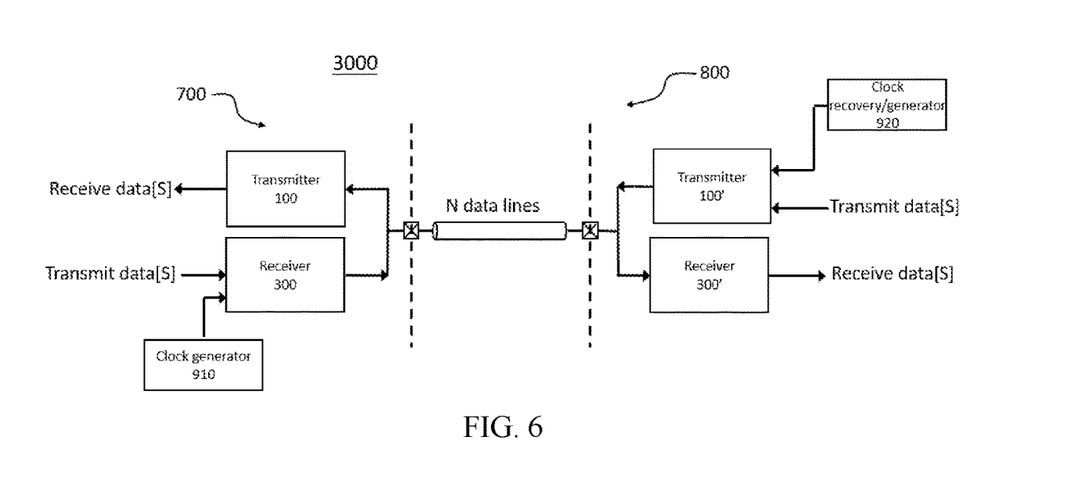
FIG. 6 illustrates a schematic diagram of a bidirectional data transmission system in an embodiment of the present application.

A bidirectional data transmission system is disclosed in Embodiment 3 of the present application, and FIG. 6 illustrates a schematic diagram of a bidirectional data transmission system 3000, wherein the system 3000 includes a master data transmission apparatus 700 and a slave data transmission apparatus 800 connected by N data lines, wherein N is an integer greater than 1. Wherein, the master data transmission apparatus 700 includes the transmitter 100 and the receiver 300 described in Embodiment I, and the slave data transmission apparatus 800 includes the transmitter 100 and the receiver 300 described in Embodiment I. It is understood that the master data transmission apparatus 700 and the slave data transmission apparatus 800 may share the same channels, that is, the same N data lines.

In an embodiment, the bidirectional data transmission system 3000 further comprises: a clock generator 910 connected to the transmitter of the master data transmission apparatus and a clock recovery/generator 920 connected to the transmitter of the slave data transmission apparatus 800.

In an embodiment, the bidirectional data transmission system 3000 further comprises a transmission controller (not shown in the figures) for controlling the transmission process between the master data transmission apparatus 700 and the slave data transmission apparatus 800 to avoid transmission conflicts. In one embodiment, the transmission controller may be a command/address controller. For example, the transmission controller comprises a command/address generator connected by a command/address bus and a command/address receiver, the command/address receiver is connected to the clock recovery/generator.

Embodiment 4

Figure 7:
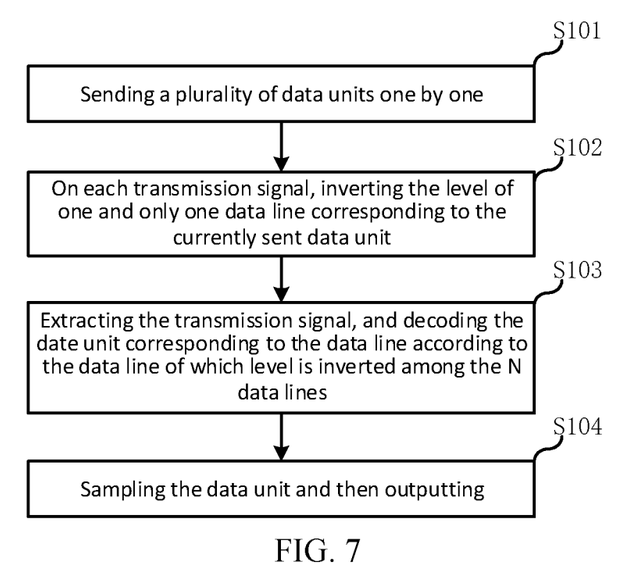
FIG. 7 illustrates a flowchart of a data transmission method in an embodiment of the present application.

A data transmission method is disclosed in embodiment 4 of the present application for transmitting data between a transmitter and a receiver connected by N data lines, N is an integer greater than 1. The method may be implemented by a data transmission apparatus 1000, a data transmission system 2000, or a bidirectional data transmission system 3000 described above. FIG. 7 illustrates a flowchart of a data transmission method in an embodiment of the present application, the method comprises:

Step S101, sending a plurality of data units one by one;

Step S102, on each transmission signal, inverting the level of one and only one data line corresponding to the currently sent data unit;

Step S103, extracting transmission signal, and decoding the data unit corresponding to the data line according to the data line of which level is inverted among the N data lines;

Step S104, sampling the data unit and then outputting.

In an embodiment, the method further comprises: encoding data to avoid sending more than two identical data units in succession, causing the level of the same data lines among the N data lines to be inverted for more than twice in succession.

In an embodiment, the method further comprises:

sampling the currently sent data unit by a clock signal to generate the transmission signal;

performing a clock recovery operation on the transmission signal and outputting a recovered clock signal;

according to the recovered clock signal, sampling the decoded data unit and then outputting.

It should be noted that in this specification of the application, relational terms such as the first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a multiple elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In this specification of the application, if it is mentioned that an action is performed according to an element, it means the meaning of performing the action at least according to the element, and includes two cases: the action is performed only on the basis of the element, and the action is performed based on the element and other elements. Multiple, repeatedly, various, etc., expressions include 2, twice, 2 types, and 2 or more, twice or more, and 2 types or more types.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

The invention claimed is:

1. A data transmission apparatus, comprising:
a transmitter and a receiver connected by N data lines, N being an integer greater than 1;
wherein the transmitter comprises:
N first transmitting units, each outputting a transmission signal to the N data lines; and
an encoder, configured to control that on each transmission signal, according to the currently sent data unit, level output by one and only one first transmitting unit is inverted, such that level of one and only one data line among the N data lines is inverted; and
wherein the receiver comprises:
N receiving units, each receiving a transmission signal from the N data lines; and
a decoder, connected to the N receiving units and configured to decode the data unit corresponding to the data line according to the data line of which level is inverted among the N data lines.

2. The data transmission apparatus of claim 1, wherein the encoder is further configured to encode data to avoid sending more than two identical data units in succession, causing the level of the same one among the N data lines to be inverted for more than twice in succession.

3. The data transmission apparatus of claim 1, further comprising a clock generator for generating a clock signal, wherein the clock signal samples data units sent by the encoder to generate the transmission signal,
the receiver further comprises a clock recovery logic which connects the N receiving units and is configured to perform a clock recovery operation on the transmission signal output by the N receiving units and to output a recovered clock signal, wherein the recovered clock signal samples the decoded data units and then outputs.

4. The data transmission apparatus of claim 1, wherein the receiving unit comprises an edge detection module and an edge feedback module, the edge detection module is configured to detect level inversion of the N data lines, and the edge feedback module is configured to acquire a signal output by the edge detection module and output it to the edge detection module for a next detection.

5. The data transmission apparatus of claim 1, wherein the encoder outputs a plurality of M-bit data units one by one, M being an integer greater than 1.

6. A data transmission system, comprises a plurality of data transmission apparatuses according to claim 1, further comprising:
an asynchronous clock recovery logic which performs asynchronous logic operations on the clock signals output by the receivers of the plurality of data transmission apparatuses and outputs the recovered clock signals.

7. A bidirectional data transmission system, comprising a master data transmission apparatus and a slave data transmission apparatus connected by N data lines, N being an integer greater than 1; wherein the master data transmission apparatus comprises a transmitter and a receiver of the data transmission apparatus according to claim 1, and the slave data transmission apparatus comprises a transmitter and a receiver of the data transmission apparatus according to claim 1.

8. The data transmission apparatus of claim 1, wherein N is equal to or greater than $2^M$.

9. The data transmission apparatus of claim 2, wherein the decoder further decodes the data encoded by the encoder.

10. The data transmission apparatus of claim 3, wherein the clock signal is a non-differential clock signal.

11. The data transmission system of claim 6, wherein the plurality of data transmission apparatuses share the same clock generator.

12. The data transmission system of claim 6, wherein the plurality of data transmission apparatuses are used to transfer data with different sizes.

13. The bidirectional data transmission system of claim 7, further comprising: a clock generator connected to a transmitter of the master data transmission apparatus; and a clock recovery/generator connected to a transmitter of the slave data transmission apparatus.

14. The bidirectional data transmission system of claim 13, further comprising a transmission controller for controlling transmission process between the master data transmission apparatus and the slave data transmission apparatus to avoid transmission conflicts.

15. The data transmission apparatus of claim 9, wherein the encoder comprises a state machine and the decoder comprises a state machine.

16. A data transmission method for transmitting data between a transmitter and a receiver connected by N data lines, N being an integer greater than 1, wherein the method comprises:
sending a plurality of data units one by one;
on each transmission signal, inverting the level of one and only one data line corresponding to the currently sent data unit;
extracting the transmission signal, and decoding the data unit corresponding to the data line according to the data line of which level is inverted among the N data lines; and
sampling the data unit and then outputting.

17. The data transmission method of claim 16, further comprising:
sampling the currently sent data unit by a clock signal to generate the transmission signal;
performing a clock recovery operation on the transmission signal and outputting a recovered clock signal; and
according to the recovered clock signal, sampling the decoded data unit and then outputting.

18. The data transmission method of claim 16, further comprising: encoding data to avoid sending more than two identical data units in succession, causing the level of the same data lines among the N data lines to be inverted for more than twice in succession.

* * * * *